United States Patent [19]

Mousseau

[11] 3,916,529
[45] Nov. 4, 1975

[54] METHOD OF AND INSTRUMENT FOR DETERMINING THE LENGTH OF A ROOT CANAL

[76] Inventor: Calvin Mitchell Mousseau, 8615 Eastside Drive, Tacoma, Wash. 98422

[22] Filed: Nov. 8, 1973

[21] Appl. No.: 414,148

[52] U.S. Cl. .............. 33/174 D; 33/169 B; 32/40 R
[51] Int. Cl.² ...................... G01B 7/26; A61B 5/05
[58] Field of Search .......... 33/174 D, 169 B; 32/40; 128/2 S, 2.1 Z; 340/85; 200/56, 52 R; 307/125, 130, 131; 324/149

[56] References Cited
UNITED STATES PATENTS

| 3,660,901 | 5/1972 | Inoue | 32/40 R |
| 3,727,604 | 4/1973 | Sidwell | 128/2.1 Z |
| 3,753,434 | 8/1973 | Pike | 32/40 R |

Primary Examiner—Richard E. Aegerter
Assistant Examiner—Willis Little

[57] ABSTRACT

The length of a root canal of a tooth is determined by an instrument having a probe in the form of a thin, flexible metal wire which is introduced into the root canal of the tooth until the probe's tip reaches the root apex. In a preliminary or calibration step, the probe is placed at the juncture of soft gum tissue and the tooth, with a conductor member held in electrical contact with the patient's lip. The probe and conductor member are electrically coupled to an electrical unit having a current meter which indicates the same reading as that obtained in the calibration step when the probe has penetrated the tooth to the apex thereof. The electrical unit may also include a silicon-controlled rectifier (SCR) and an electric lamp adapted to be lighted upon conduction of the SCR as a result of the tip of the probe having reached the root apex.

1 Claim, 2 Drawing Figures

METHOD OF AND INSTRUMENT FOR DETERMINING THE LENGTH OF A ROOT CANAL

BACKGROUND OF THE INVENTION

1. FIELD OF THE INVENTION

This invention relates to dental or endodontic instruments and, more particularly, to a method and to an improved instrument for more precisely determing the length or depth of a root canal of a tooth. With such an instrument or by reason of the method it is now possible to obtain a clear visual indication that a probe has reached the apex of the root canal. This indication is based on a utilization of the differences in specific resistance between the tooth and soft gum tissue in its vicinity.

2. DESCRIPTION OF THE PRIOR ART

The usual procedure in root canal work is to first remove the tooth pulp and then employ extremely fine reamers to remove material in the root canal for subsequent sterilization and filling steps. It is essential to the success of this endodontic operation that the preparation of each root canal be carried out along its entire length. On the other hand, it is necessary for a dentist to more precisely control and limit the penetration of the reamer so as not to penetrate beyond the root apex and irritate the peridontal tissues.

In order to limit the depth of penetration, one conventional practice in the endodontic art is to ascertain the length of the root canal prior to penetration by inserting a thin, flexible wire into the root canal and X-raying the tooth. However, this procedure is time-consuming and requires an expensive X-ray camera.

To this can be added the disclosure in U.S. Pat. No. 3,660,901 granted to Noboru Inoue on May 9, 1972 which discloses an instrument for determining the length of a root canal by transmitting an audible signal when a probe reaches the root apex. One of the principal problems inherent in the Inoue arrangement, however, is that the oscillation sounds to the ear of the dentist are extremely difficult to detect and vary with the hearing ability of the dentist.

No prior art device or method of which application is aware possesses the degree of accuracy and precision which can be utilized with confidence.

It would, therefore, be desirable to have a device and method which would ensure an accurate and precise determination of the depth of the root canal of a tooth with substantially no penetration beyond the root apex.

OBJECTS AND SUMMARY OF THE INVENTION

It is therefore a primary object of the present invention to provide an improved instrument for determining the length of a root canal with a view to overcoming the above-stated disadvantages.

It is another object of the present invention to provide an improved instrument of the aforementioned character that permits a dentist to gauge, visually rather than audibly, his approach to the apex of a tooth.

It is a further object of the present invention to provide an improved instrument of the aforementioned character that provides an accurate and clear visual indication of a probe having penetrated a tooth to the apex thereof.

It is still another object of the present invention to provide novel electronic circuitry for an instrument of the aforementioned character that is simple in design and inexpensive to manufacture.

It is yet another object of the present invention to provide a method for more precisely determining the length of a root canal.

These and other objects of the invention are achieved by providing a method and an improved instrument for determining the length or depth of a root canal, the instrument comprising a probe in the form of a thin, flexible metal wire adapted to be introduced into the root canal, a conductor member adapted to be held in electrical contact with the patient's lip, and an electrical unit having a current meter which gives an indication of electrical impedance as viewed between the probe and conductor member. In use, the probe is first placed at the juncture of soft gum tissue and the tooth, with the conductor member held in electrical contact with the patient's lip. Then, the probe is introduced into the root canal until the current meter indicates the same reading as that obtained in the preliminary or calibration step, which occurs when the tip of the probe reaches the root apex. In another embodiment, the electrical unit includes an electric lamp adapted to be lighted in response to the probe having penetrated the tooth to the apex thereof.

The novel features that are considered characteristics of this invention are set forth with particularly in the appended claims. The invention will best be understood from the following description when read in connection with the accompanying drawings.

DETAILED DESCRIPTION OF PREFERRED EMBODIMENTS

Figure 1:
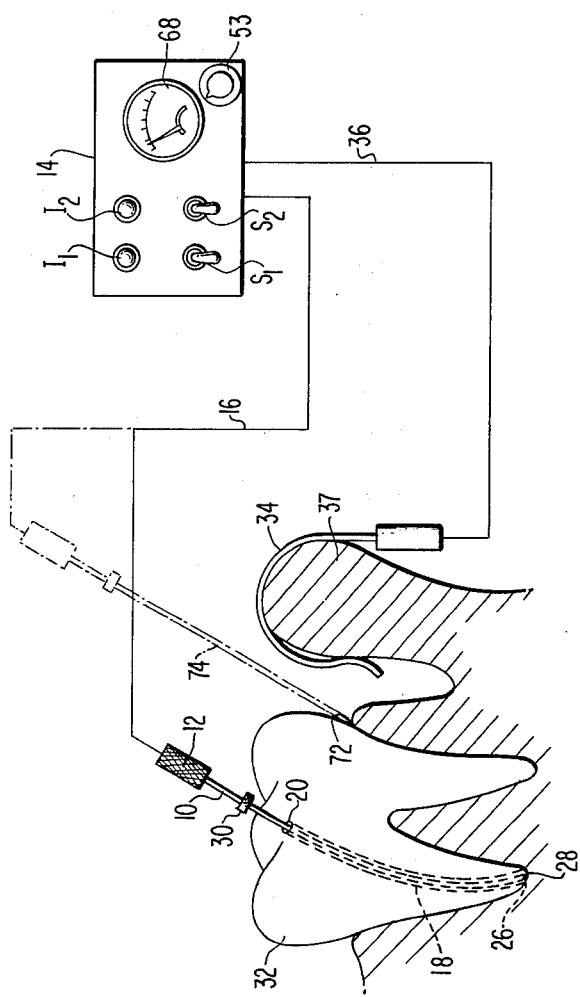
FIG. 1 is a schematic enlarged view of a typical tooth including various elements forming part of the inventive instrument such as a probe inserted into one of its root canals, a conductor member in position, and an electrical unit.

Referring now to the drawings, there is shown in FIG. 1 a probe 10 in the form of a thin, flexible metal wire which has a head 12 adapted to be gripped by the fingers. The head 12 is preferably made of insulating material, although it may be a metallic body electrically insulated from the wire portion. The probe 10 is coupled to an electrical unit generally designated by 14 by means of a shielding wire 16. For the purpose of determining the length of a root canal 18, the probe 10 is inserted through an exposed aperture 20 into the root canal 18 until the tip or extremity 26 of the probe 10 reaches the root apex 28 of the root canal 18. As will be described below in detail, the electrical unit 14 can provide an accurate and clear visual indication that the tip 26 of the probe 10 has reached the root apex 28 with the result that undesirable penetration beyond the root apex 28 is substantially eliminated. The measurement of the length of the canal is recorded by a collar 30 which snugly fits on the probe 10. When the probe has been fully inserted into the canal 18, the collar 30 is moved down along the wire until it rests against the crown 32 of the tooth. The length or depth of the root canal 18 may be determined by reference to the distance between the collar 30 and the tip 26 of the probe 10 after the probe is withdrawn from the tooth.

A conductor member 34 in the form of a hook is connected to the electrical unit 14 by means of a shielding wire 36. The conductor member 34 is adapted to be placed over the lower lip 37 of the patient in the vicinity of the tooth so as to be held in electrical contact with the patient's body.

Figure 2:
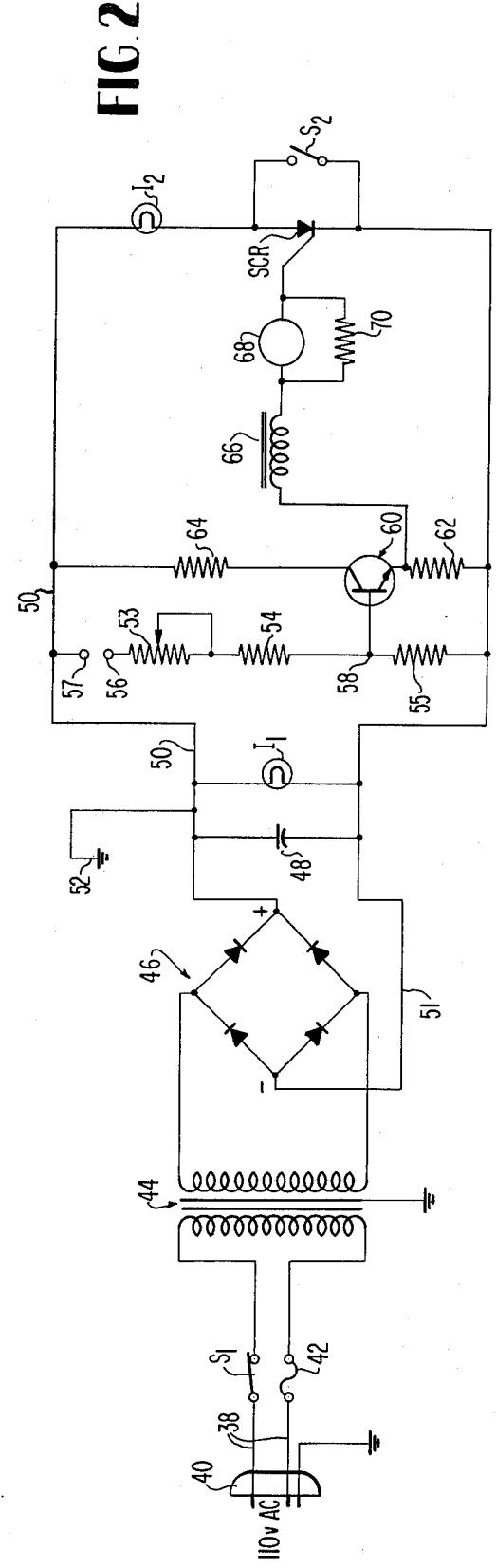
FIG. 2 is a circuit diagram of the electrical unit shown in FIG. 1.

Referring now to FIG. 2, there is shown a typical form of the electrical unit 14 constructed in accordance with the teachings of the present invention. The electrical unit 14 is provided with a cable 38 and a socket 40 for plugging into any suitable receptacle (not shown) to supply AC power for the electrical unit. A single-pole, single-throw switch $S_1$ is connected to the cable, together with a fuse 42, to energize or deenergize the electrical unit 14. The cable 38 is coupled to a step-down transformer 44 having a voltage ratio of, for example, 20:1, which in turn is connected to a full-wave rectifier generally designated by 46. The rectifier 46 comprises four diodes connected in a conventional bridge form to rectify the AC voltage supplied through the step-down transformer 44, to provide a DC voltage. A smoothing capacitor 48 and an electric lamp $I_1$ are connected in parallel across the output of the full-wave rectifier 46.

Power to the DC part of the circuit shown is applied across a pair of conductors 50 and 51 which are connected to the full-wave rectifier 46. It should be noted that conductor 50, which is connected to the positive (+) terminal of the rectifier is grounded as at 52. When the cable 38 is connected to a conventional AC supply source (not shown) by means of the socket 40, the electric lamp $I_1$ is illuminated upon closure of the switch $S_1$ to indicate that the electrical unit is in an energized condition.

A probe means comprising the probe 10 and the conductor member 34, a potentiometer 53, a resistor 54 of fixed value, and another resistor 55 of fixed value, are connected in series between the conductors 50 and 51 to form a voltage divider. More particularly, the probe 10 is connected to a terminal 56 leading to the potentiometer 53, and the conductor member 34 is connected to a terminal 57 leading to the conductor 50. The conductor member 34 is connected to the terminal 57 which in turn is connected to the ground line 50 because the conductor member 34 is always held in electrical contact with the patient's body during the entire process of determining the length of a root canal.

In order to amplify voltage variations at a point 58 between the resistors 54 and 56, the circuitry includes a current amplifier comprising a transistor 60 of the NPN type, the base thereof being connected to the point 58. The transistor 60 has its emitter connected to one conductor 51 through a resistor 62 and its collector connected to the other conductor 50 by way of a resistor 64. The emitter of transistor 60 is also connected to an inductance coil 66 which in turn is connected to a current meter 68. The purpose of the inductance coil 66 is to suppress current surges from the AC line, and possibly from the patient's mouth, from triggering a silicon-controlled rectifier (SCR), the gate of which is connected to the ammeter 68. The ammeter 68 includes a resistor 70 connected thereacross.

The silicon-controlled rectifier (SCR) may be of the conventional type in which a variation of gate current causes variation of anode-to-cathode breakover voltage. As will be understood, the SCR serves as an electronic switch to control energization of a second electric lamp $I_2$ which is connected in series with the SCR between the conductors 50 and 51. A normally open switch $S_2$, which may be of the conventional single-pole, single-throw type, is connected between the anode and cathode of the SCR for the purpose which will be apparent hereinafter.

MODE OF OPERATION

To determine the length or depth of a root canal, such as the root canal 18, the conductor member 34 is first placed over the patient's lip 37 in the vicinity of the tooth which is to be examined, as is seen in FIG. 1. In this case, it is important to ensure that the conductor member 34 is held in electrical contact with the lip by, for example, immersing the conductor member 34 in water or supplying saliva onto the conductor member 34 prior to its placement over the patient's lip. As a second or calibration step, the probe 10 is placed at the juncture or the gum line or interface 72 of soft gum tissue and the tooth, as is clearly indicated by the dotted lines 74 of FIG. 1. Since a current path is established through the patient's body between the probe 10 and conductor member 34, the circuitry shown in FIG. 2 produces a reading on the ammeter 68 that is indicative of the impedance as viewed therebetween. The meter reading obtained in the calibration step should be kept in mind by the dentist for the subsequent working step in which the probe 10 is inserted into the root canal 18. During the working step, the ammeter 68 gives an indication of a considerably greater impedance than that indicated in the calibration step, since the specific resistance of the tooth is much higher than that of the soft gum tissue. The probe 10 continues to be inserted into the root canal until the ammeter 68 indicates the same reading as that obtained in the calibration step, which occurs at the very moment when the tip or extremity 26 of the probe 10 reaches the root apex 28. This is so because at the apex 28 a condition, which is substantially an interface condition, is reached.

It should be understood that, during the working step, the dentist can gauge his approach to the root apex 28 by viewing the reading on the ammeter 68 while gradually inserting the probe 10 into the root canal 18, which is followed by a clear indication on the ammeter 68 that the probe 10 has penetrated the tooth to the apex 28 thereof.

Alternatively, in the calibration step, the potentiometer 53 may be adjusted in the direction of decrease of its resistance to the point where the electric lamp $I_2$ is illuminated upon conduction of the SCR as a consequence of the voltage increase at the point 58 of the voltage divider. It will be appreciated that, with this adjustment, the dentist can perceive the probe's tip having reached the apex, by observing electric lamp $I_2$ being lighted as well as by viewing the same reading on the current ammeter 68. After the electric lamp $I_2$ is illuminated, the dentist can ascertain that he has reached the apex 28, by momentarily closing the switch $S_2$ so as to disable the SCR.

When the penetration of the probe 10 to the root apex 28 has been ascertained, the collar 30 is moved down along the probe wire until it rests against the upper surface of the tooth. The probe 10 is then withdrawn from the tooth, with the collar remaining at the same point on the wire as it was when the probe was in the root canal. The length of the root canal 18 is the same as the distance between the collar 30 and the tip 26 of the probe.

In view of the foregoing, it will be appreciated that the present invention has the advantage of more accurate determination of the length of a root canal over the prior art devices. Another advantage of the present invention resides in the ability to more precisely control the penetration of a probe as close to the apex of the root canal as possible. Still another advantage is derived from the disclosed method which recognizes the benefit to be derived from utilizing a calibration step in conjunction with a working step, that is, a step where the probe is inserted into and along the root canal.

Having thus disclosed the preferred embodiments of the invention, it is to be understood that various changes and modifications may be made by those skilled in the art without departing from the spirit of the invention.

What is claimed is:

1. An instrument for determining the length of a root canal of a tooth comprising:

probe means comprising a probe in the form of a thin, flexible metal wire adapted to be introduced into the root canal and a conductor member adapted to be held in electrical contact with the patient's body in the vicinity of the tooth, wherein said probe may be, in a calibration step, positionable at the juncture of soft tissue and the tooth, the length of a root canal of which is to be determined, and thereafter may be introduced into said root canal until said indicator means indicates the same reading as that obtained in said calibration step;

a voltage source;

a step-down transformer connected to the voltage source;

a full-wave rectifier connected across the transformer for producing a D.C. output;

a smoothing capacitor and an electric lamp connected in parallel and across said rectifier;

a variable resistor;

a voltage divider comprising a pair of fixed resistors;

first circuit means connecting said probe means, said conductor member, said variable resistor and said fixed resistors in series across said voltage source;

a current amplifying transistor;

second circuit means connecting the input of said amplifying transistor between the fixed resistors of the voltage divider;

a fixed resistor connected to one side of said voltage source and the collector of the current amplifying transistor;

a fixed resistor connected to the other side of said voltage source and the emitter of the current amplifying transistor;

a current meter serving as an indicator means;

third circuit means including an inductance coil connected between the current meter and the collector side of the amplifier;

an electron discharge device in the form of a silicon-controlled rectifier connected to the current meter;

a normally open switch connected to the anode and cathode electrodes of said silicon-controlled rectifier;

alarm means in the form of a lamp; and fourth circuit means connecting the silicon-controlled rectifier and the alarm in series across said voltage source to cause energization of said alarm means upon conduction of said electron discharge device; wherein said variable resistor may be, in a calibration step, adjusted in the direction of decrease of its resistance until said electron discharge device is rendered conductive, with the probe placed at the juncture of soft tissue and the tooth, and said silicon-controlled rectifier is adapted to be rendered conductive when the output of said amplifier exceeds a predetermined level.

* * * * *